July 7, 1959
C. CASTELLI
2,893,405
DENTAL FLOSS CONTAINER
Filed Nov. 29, 1957
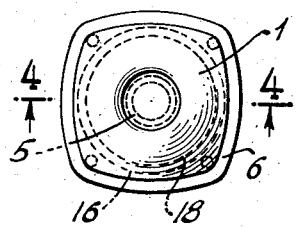
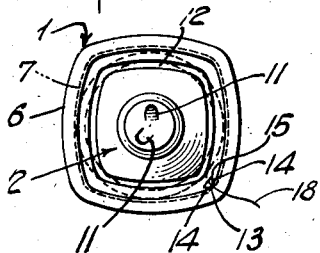
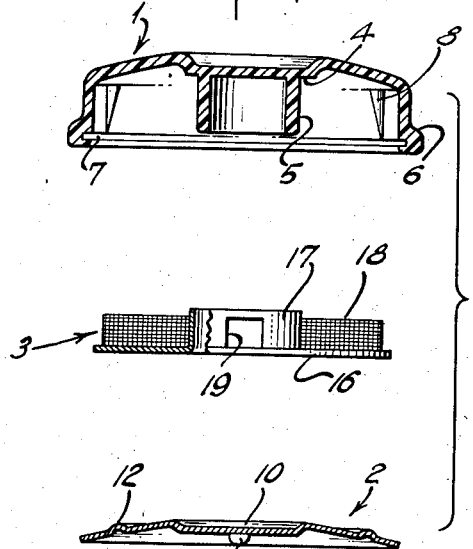
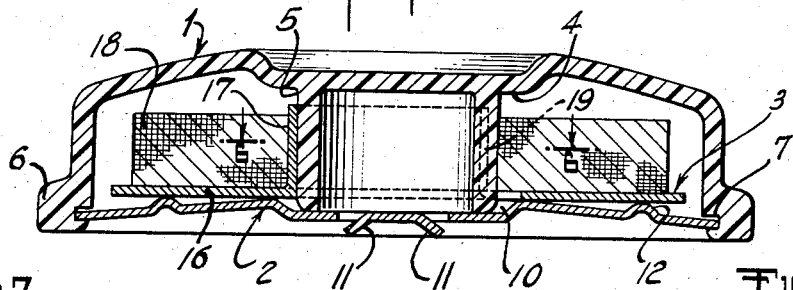
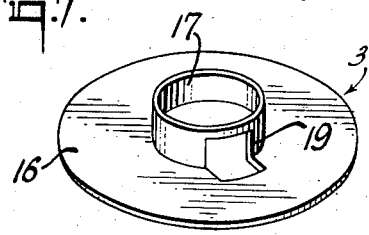
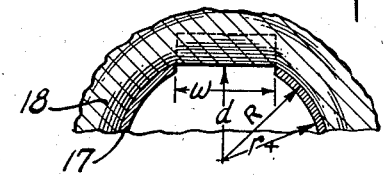
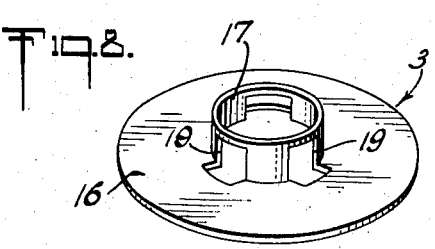
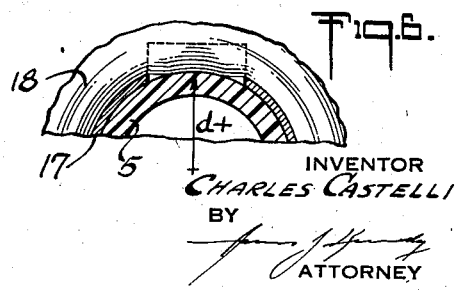
INVENTOR
CHARLES CASTELLI
BY
ATTORNEY

United States Patent Office 2,893,405
Patented July 7, 1959

2,893,405

DENTAL FLOSS CONTAINER

Charles Castelli, New Brunswick, N.J., assignor to Johnson & Johnson, a corporation of New Jersey Application November 29, 1957, Serial No. 699,615

15 Claims. (Cl. 132—92)

This invention relates to spools.

More particularly, the invention is concerned with rotatable spools carried on stationary spindles or supports and with the prevention of over-running as the material wound on the spool is drawn off.

The general object of the invention is to provide an improved braking means for spools.

While capable of other uses, the device of the invention is primarily intended for use as a dental floss dispenser and for small pocket-size dispensers. Such dispensers must be compact and economical in construction and the provision of adequate braking mechanism presents considerable difficulty. A variety of friction devices operating on the spool core or barrel, or on a flange, have been proposed but are difficult to manufacture within practical limits as to cost and size. The present invention provides a braking means which does not necessitate any added parts or precision of manufacture or, in fact, add in any appreciable degree to the cost, weight or size of the dispenser and which is not materially affected by variation in dimension of parts, within wide manufacturing tolerances.

A dispenser embodying the invention will now first be described with reference to the accompanying drawing, and the features forming the invention will then be pointed out in the appended claims.

In the drawing:

Fig. 1 is a top plan view of a dispenser embodying the invention in a preferred form;

Fig. 2 is a bottom plan view of the dispenser of Fig. 1;

Fig. 3 is an enlarged exploded central axial section;

Fig. 4 is a further enlarged section on the line 4—4 of Fig. 1;

Fig. 5 is a fragmentary section on the line 6—6 of Fig. 4, showing the spool removed from the core, or spindle;

Fig. 6 is a section similar to Fig. 5, but showing the spool in place on the core;

Figs. 7 and 8 are isometric views of two forms of spool used in the dispenser of the invention.

The dispenser comprises a case including a top element 1 and bottom element 2 which fit together and hold the spool 3. In the construction shown, top element 1 is a molded plastic part and the elements 2 and 3 are stamped from sheet metal.

The top 1 has a central inner boss 4 for abutting the spool and a center part or spindle 5 which carries the spool 3. The lower edge or rim of the top 1 is widened somewhat, as indicated at 6, and formed internally with a groove 7 into which the bottom element 2 fits as shown best in Fig. 4. The parts have sufficient elasticity or spring to permit snapping the element 2 into place. Top 1 has a rounded rectangular shape as viewed in plan and may be reinforced at the corners by means of ribs 8. As will be apparent, the top element 1 of the dispenser is conveniently manufactured as a unitary element by mass production plastic molding techniques, from polystyrene or any other plastic which possesses suitable characteristics as to strength, cheapness and appearance.

The bottom 2 is dished inwardly and centrally recessed as shown at 10 to receive the end of part 5. The center of the recess is struck outwardly to form two tongues 11 around which the floss may be wrapped and cut, in the usual way. A rib 12 for supporting the spool flange and stiffening the element 2 may also be formed in this element. One corner of the element 2 is cut out as shown at 13 in Fig. 2, to permit drawing out the floss. The side walls 14 of this opening converge toward each other making the radially inward edge of the opening wider so that, if the floss is tensioned and tends to slip laterally, it will slide into a corner 15 instead of sliding out and catching between the elements 1 and 2.

The spool 3 has a flange 16 and central hub or barrel 17, conveniently stamped in one piece from sheet metal, the floss 18 being wound around the hub 17 and against the flange, as usual. However, the hub 17 is formed with one or more cut-outs or apertures 19 which may extend almost the entire length of the hub and slightly into the flange, as shown. The number of these cut-outs may be varied according to the particular requirements, using one, two, three or even more, depending on the size of spool, type of material wound on it, and other factors. Fig. 7 shows a spool using one such cut-out and Fig. 8 a spool using three such cut-outs, which for a pocket dental floss dispenser, such as disclosed, is the preferred construction. When the floss is wound on the spool in the usual way, the winding tension stretches the filament chordwise across the opening or openings 19 as shown in Fig. 5. The chordwise width of opening 19 is selected in relation to the thickness of metal in the barrel and clearness between the spool and spindle, so that the floss will engage the spindle 5 and brake the spool, preventing over-running. Thus, the chord width $w$ may be about $$2\sqrt{R^2-r^2}$$

where $r$ is the spindle radius and $R$ the outside radius of the barrel. Increasing the width $w$ over this figure will increase the braking effect and decreasing this width will decrease the braking effect. In the construction shown in Fig. 8, with a barrel radius of about 3/16", openings about 1/8" wide are found satisfactory.

As will be apparent, when the spool is placed on the spindle 5, there is interference between spindle and floss so that the floss is pressed outward radially as shown in Fig. 6, and grips the spindle. The amount of gripping action obtained is readily controlled to prevent over-running while not interfering with any turning of spool on spindle. The precise amount of interference is not critical and the spool and spindle may be constructed with ordinary loose tolerances without giving rise to any difficulty. Any tendency toward pushing the floss axially is resisted by flange 16 when the spool is inserted in the manner indicated, with the flangeless end of barrel 17 uppermost.

In use, the dispenser is held between the fingers of one hand, a sufficient length of floss is pulled out and passed around the tongues 11 and then jerked so as to sever the end against an edge of one of the tongues 11. The floss stretching from opening 13 to tongues 11 may readily be picked up with the fingers to repeat this operation, due to the dishing of the bottom plate 2. Due to its simplicity, the construction is cheap enough to be disposable and is merely thrown away when the contents have been used up.

What is claimed is:

1. A dispensing device for filamentary material comprising a spool supporting structure having a stationary spindle, a spool rotatably carried on the spindle, the spool comprising a tubular and generally cylindrical barrel fitting the spindle and having an aperture, a plurality of layers of filamentary material wound on the said barrel and engaging against the spindle through the aperture, whereby rotation of the spool on the spindle is braked for preventing over-running.

2. A dispensing device according to claim 1, in which the aperture is of such width that a cord between its exterior edges intersects the cylindrical inner surface of the barrel.

3. A dispensing device according to claim 2, in which the said barrel has a plurality of said apertures spaced symmetrically around its circumference.

4. A dispensing device according to claim 3, having three such apertures symmetrically spaced around the barrel.

5. A dental floss container comprising a casing having a spindle and a floss spool carried rotatably on the spindle, the spool comprising a tubular and generally cylindrical barrel having an aperture and a plurality of layers of dental floss wound on the said barrel and engaging against the spindle through the aperture, whereby rotation of the spool on the spindle is braked for preventing overrunning.

6. A dental floss container according to claim 5, comprising also a snap cover plate cooperating with said casing to enclose the spool.

7. A dental floss container according to claim 5, in which the cover plate has centrally located exterior tongues for cutting the floss end and an opening at its edge for passage of the floss out of the enclosure.

8. A dental floss container according to claim 7, in which the said opening has slanted sides for guiding the floss, when tensioned thereagainst, toward the center of the plate and away from its edge.

9. A dental floss container comprising a casing having a spindle and a floss spool carried rotatably on the spindle, the spool comprising a tubular and generally cylindrical barrel having an aperture and a flange fixed to the barrel at its end adjacent the tip of the spindle, and a plurality of layers of dental floss wound on the said barrel and engaging against the spindle through the aperture, whereby rotation of the spool on the spindle is braked for preventing overrunning.

10. A dental floss container comprising a unitary molded plastic casing having a central spindle and flange wall and a floss spool carried rotatably on the spindle, the spool comprising a tubular and generally cylindrical barrel having an aperture and a flange fixed to the barrel at its end adjacent the tip of the spindle, a plurality of layers of dental floss wound on the said barrel and engaging against the spindle through the aperture, whereby rotation of the spool on the spindle is braked for preventing overrunning, and a metal closure plate having a snap fit in the flange wall of the casing and holding the spool in place on the spindle.

11. A dental floss container comprising a unitary molded plastic casing having a central spindle and flange wall and a floss spool carried rotatably on the spindle, the spool comprising a tubular and generally cylindrical barrel having an aperture and a flange fixed to the barrel at its end adjacent the tip of the spindle, a plurality of layers of dental floss wound on the said barrel and engaging against the spindle through the aperture, whereby rotation of the spool on the spindle is braked for preventing overrunning, and a metal closure plate having a snap fit in the flange wall of the casing and holding the spool in place on the spindle, the said closure plate having a centrally located floss cutter and an edge opening for passage of floss out of the container to the cutter.

12. A dental floss container according to claim 11, in which the said opening comprises an open notch closed off by the molded plastic casing and having side walls diverging from each other toward the bottom of the notch, whereby tensioning the floss against a said side wall urges it inwardly toward the bottom of the notch.

13. A dental floss container comprising a unitary molded plastic casing having a central spindle and flange wall and a floss spool carried rotatably on the spindle, the spool comprising a tubular and generally cylindrical barrel having an aperture and a flange fixed to the barrel at its end adjacent the tip of the spindle, the said aperture extending along the barrel substantially from the flange to a point near the opposite end of the barrel, a plurality of layers of dental floss wound on the said barrel and engaging against the spindle through the aperture, whereby rotation of the spool on the spindle is braked for preventing overrunning, and a metal closure plate having a snap fit in the flange wall of the casing and holding the spool in place on the spindle.

14. A dental floss container comprising a unitary generally square molded plastic casing having a central spindle and flange wall with reinforcing thick sections at the corners, and a floss spool carried rotatably on the spindle, the spool comprising a tubular and generally cylindrical barrel having an aperture and a flange fixed to the barrel at its end adjacent the tip of the spindle, a plurality of layers of dental floss wound on the said barrel and engaging against the spindle through the aperture, whereby rotation of the spool on the spindle is braked for preventing overrunning, and a metal closure plate having a snap fit in the flange wall of the casing and holding the spool in place on the spindle.

15. A dental floss container according to claim 14, in which the closure plate has an opening at one corner for passage of floss out of the container and the said corner reinforcing sections taper to substantially the wall thickness generally, where the closure plate snaps into the casing.

References Cited in the file of this patent

UNITED STATES PATENTS

| | | |
|---|---|---|
| 1,210,205 | Richardson | Dec. 26, 1916 |
| 1,455,673 | Shalek | May 15, 1923 |
| 1,899,796 | Deane | Feb. 28, 1933 |
| 2,376,152 | Karle | May 15, 1945 |
| 2,381,530 | Dembenski | Aug. 7, 1945 |
| 2,476,593 | Gerbing | July 19, 1949 |
| 2,483,528 | Christoff | Oct. 4, 1949 |

FOREIGN PATENTS

| | | |
|---|---|---|
| 215,691 | Great Britain | May 15, 1924 |
| 1,022,222 | France | Dec. 10, 1952 |